Patented Jan. 2, 1923.

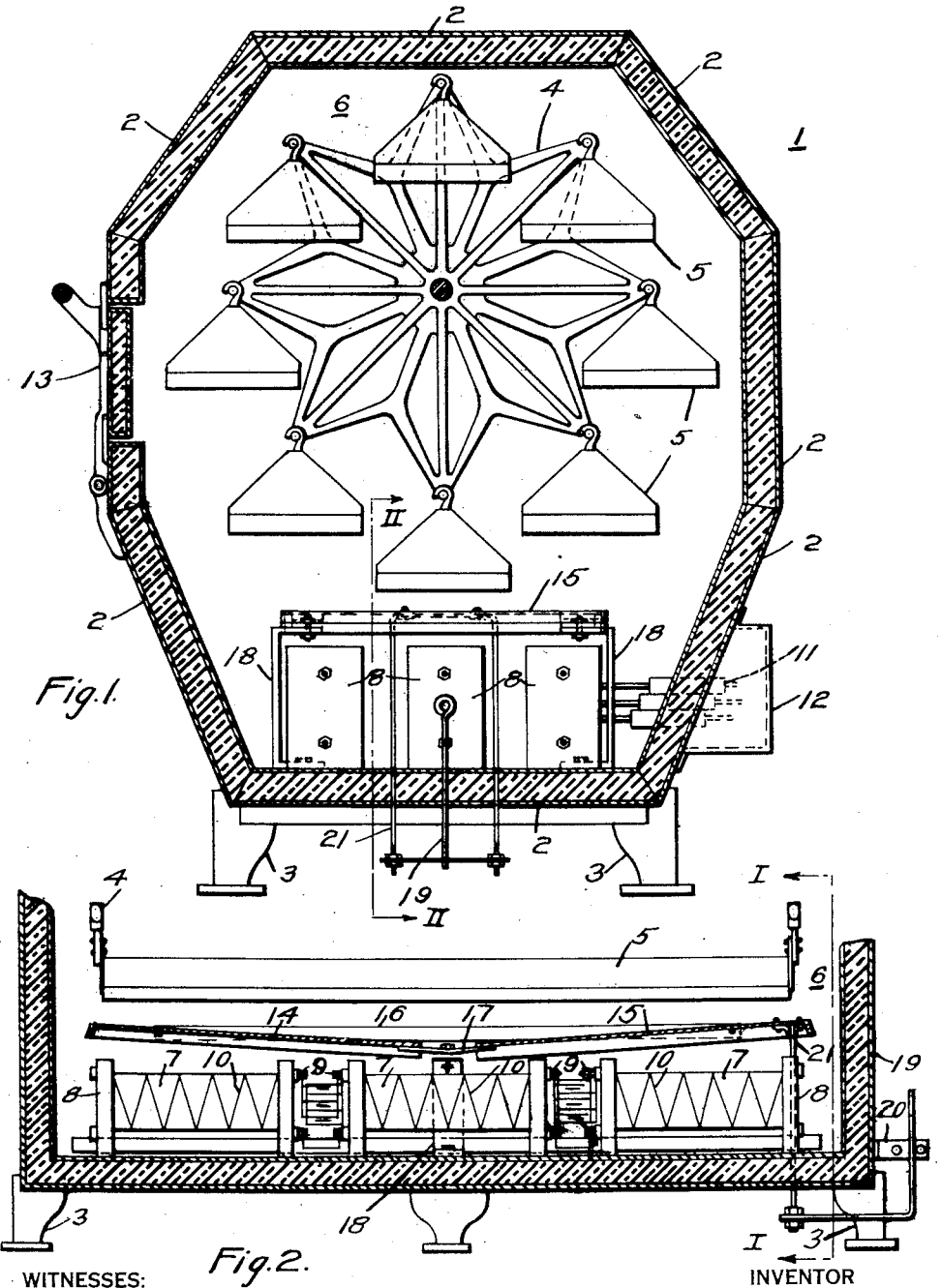

1,440,519

UNITED STATES PATENT OFFICE.

JAMES C. WOODSON, OF MANSFIELD, OHIO, ASSIGNOR TO WESTINGHOUSE ELECTRIC PRODUCTS COMPANY, A CORPORATION OF MICHIGAN.

ELECTRIC BAKE OVEN.

Application filed June 3, 1921. Serial No. 474,726.

*To all whom it may concern:*

Be it known that I, JAMES C. WOODSON, a citizen of the United States, and a resident of Mansfield, in the county of Richland and State of Ohio, have invented a new and useful Improvement in Electric Bake Ovens, of which the following is a specification.

My invention relates to electrically heated apparatus and particularly to electrically heated reel-type bake ovens, and it has for its object to provide a relatively simple and easily operated means for equalizing the heating effects at the two ends of a bake oven of the type designated.

I have found that where the length of the enclosing casing is relatively great, as compared to the lateral dimensions, there is a tendency toward an unequal distribution of the convection currents of heated air at each end of the casing, resulting in unequal baking of material contained in the oven.

In practicing my invention, I provide a relatively elongated casing in which is located a plurality of revoluble shelves upon which the loaves of bread or other material to be baked may be placed. I provide an electric heating element located at the bottom of the casing and extending substantially over the entire length thereof. I provide a pair of baffle plates angularly disposed relatively to each other, pivotally mounted above the heating element and adjustable relatively thereto by means of mechanism extending to the outside of the casing.

In the single sheet of drawings:

Figure 1 is a view, in vertical lateral cross section on the line I—I of Fig. 2, of a reel-type bake oven comprising the device embodying my invention, and Fig. 2 is a view, in vertical cross section on the line II—II of Fig. 1, of a portion of the oven illustrated in Figure 1.

A bake oven 1 comprises a casing consisting of a plurality of wall sections which are indicated generally by the numeral 2, mounted on supporting members 3. A plurality of reels 4 support a plurality of shelves 5 adapted to be revolved in the oven. The sections 2 are of such contour and dimensions that, when assembled, the outline of the oven is substantially as indicated in Figure 1 and encloses the oven chamber 6.

Inasmuch as the structural details of the casing, the supporting members 3, the reel 4 and the shelves 5 are more fully disclosed and claimed in my copending application Serial No. 480,289, filed June 25, 1921, it is believed that a further description of these parts is unnecessary.

At the bottom of the casing in the oven chamber 6 is located a plurality of heating elements 7 comprising, in general, a plurality of metallic end frames 8, and insulated bolts 9 upon which a suitable metallic resistor member 10 may be wound.

Suitable electrical connections are provided between the individual heating units 7, and suitable terminal connectors 11 are brought out at the rear of the oven casing and are protected by a terminal box 12, suitably secured against the casing.

The oven chamber 6 is closed, except for an opening at the front through which bread and other material to be baked may be inserted and removed, a hinged door 13 being provided for such opening.

I have found that convection currents of heated air, by means of which the entire oven chamber is maintained at any predetermined temperature, may vary and may be greater at one end of the oven chamber than at the other, resulting in unequal baking of the articles placed upon the shelves 5. This may be caused by the oven not being substantially horizontal, or by reason of unequal heating effects of the various heating units or because the convection currents of heated air are not distributed symmetrically in the two longitudinal halves of the oven chamber.

In order to equalize the heating effect by insuring a substantially uniform distribution of convection currents of heated air, I provide two baffle plates 14 and 15 each having a downturned flange at its outer end and extending from the middle of the oven to the outer ends of the respective heating elements. Two elongated bars 16 are located at the respective sides of the baffle plates 14 and 15 and connected thereto near their outer ends. The separated inner ends of the two baffle plates are operatively connected by means of a plurality of bent bars 17 which are tiltably supported upon a pair of members 18, each of which may be an elongated bar of channel shape, as indicated in the drawing.

In order to provide means for adjusting the angular position of the baffle plates relatively to the heating elements, I provide a handle 19, comprising a bar of substantially L-shape, slidably mounted in a bracket 20, secured against the outside of the oven casing at one end thereof. A metallic member 21, of substantially U-shape, is secured to the outer end of one of the baffle plates on the under side thereof and extends through the bottom of the casing where it is connected to the extension of the handle 19.

If, for any of the hereinbefore enumerated reasons, it is found that a portion of the material being baked in the oven is heated to a higher temperature at one end of the oven than that placed at the other end, it is only necessary to suitably adjust the baffle plates 14 and 15 by means of the handle member 19 until the heating effects are again substantially uniform as evidenced by the uniform browning of the material undergoing the baking operation. If, for instance, it is found that the heating effect is greater at that end of the oven in which the baffle plate 15 is located, that plate may be moved downwardly a small amount, while, at the same time, the plate 14 is moved upwardly a correspondingly small amount. This has the tendency of again equalizing the convection currents of air which are caused to circulate in the oven by reason of the baffle-plate structure hereinbefore described.

It may be noted that the device embodying my invention provides relatively simple and easily operated means for equalizing the convection currents of air in the elongated oven casing, thus permitting of equalizing the heating effects at the two ends thereof.

Various modifications may be made in the device embodying my invention without departing from the spirit and scope thereof, and I desire that only such limitations shall be placed thereon as are imposed by the prior art or are specifically set forth in the appended claims.

I claim as my invention:

1. An electrically heated apparatus comprising an elongated casing, a reel extending longitudinally of said casing and adapted to revolve material to be treated, an electric means located in said casing for heating said material and means in said casing for equalizing the convection currents of heated fluid therein.

2. An electrically heated apparatus comprising a casing, a reel in said casing for moving material to be treated therein, an electric heating means for heating said material and means in said casing for equalizing the amount of heat conducted to said material by convection currents of air.

3. An electrically heated bake oven comprising a casing, a plurality of shelves in said casing adapted to move material to be baked revolubly in said casing, an electrical heating element located at the bottom of said casing for heating the material placed on said shelves by means of convection currents of air and means for varying the distribution of said convection currents of air.

4. An electrically heated bake oven comprising an elongated casing, a plurality of shelves adapted to move material to be baked revolubly in said casing, an electrical heating element for heating material placed on said shelves by means of convection currents of air and means operatively associated with said heating element for equalizing the distribution of said convection currents of air.

5. An electrically heated bake oven comprising an elongated casing, a plurality of elongated shelves adapted to move material to be baked revolubly in said casing, an electric heating means located at the bottom of said casing to heat said material and means operatively associated with said heating means for preventing unequal heating of the material on said elongated shelves.

6. An electrically heated bake oven comprising an elongated casing, a plurality of elongated shelves adapted to move material to be baked revolubly in said casing, an electric heating means located at the bottom of said casing to heat said material and means operatively associated with said heating means for preventing unequal heating of the material on said elongated shelves, said means comprising a pair of angularly disposed baffle plates movable relatively to the said heating means.

7. An electrically heated bake oven comprising an elongated casing, a plurality of elongated shelves adapted to move material to be baked revolubly in said casing, an electric heating means located at the bottom of said casing to heat said material by convection currents of heated air and means operatively associated with said heating means for preventing unequal heating of the material on said elongated shelves, said means comprising a pair of baffle plates angularly disposed relatively to each other, located above said electric heating means and adjustable relatively thereto.

8. An electrically heated bake oven comprising an elongated casing, a plurality of elongated shelves adapted to move material to be baked revolubly in said casing, an electric heating means located at the bottom of said casing to heat said material by convection currents of heated air and means operatively associated with said heating means for preventing unequal heating of the material on said elongated shelves, said means comprising a pair of angularly disposed baffle plates tiltably mounted above said heating means and an adjusting member for said baffle plates located outside of said casing.

9. An electrically heated bake oven comprising an elongated casing, a plurality of elongated shelves adapted to move material to be baked revolubly in said casing, an electric heating means located at the bottom of said casing to heat said material by convection currents of heated air, a pair of angularly disposed baffle plates tiltably mounted above said heating means and an adjusting means for said baffle plates mounted on the outside of the casing.

10. An electrically heated bake oven comprising a casing, means in said casing for moving material to be treated therein, electric means for heating the interior of the casing, and means in said casing for equalizing the amount of heat conducted to said material.

In testimony whereof, I have hereunto subscribed my name this 23rd day of May, 1921.

JAMES C. WOODSON.